United States Patent
Tu

(10) Patent No.: US 6,999,875 B2
(45) Date of Patent: Feb. 14, 2006

(54) DISPLAY METHOD AND APPARATUS FOR NAVIGATION SYSTEM

(75) Inventor: Ihung S. Tu, Anaheim, CA (US)

(73) Assignee: Alpine Electronics, Inc, Tokyo (JP)

(*) Notice: Subject to any disclaimer, the term of this patent is extended or adjusted under 35 U.S.C. 154(b) by 0 days.

(21) Appl. No.: 10/774,086

(22) Filed: Feb. 6, 2004

(65) Prior Publication Data

US 2005/0177304 A1    Aug. 11, 2005

(51) Int. Cl.
*G01C 21/00* (2006.01)
*G08G 1/123* (2006.01)

(52) U.S. Cl. .............. 701/211; 701/212; 340/995.14; 340/995.26; 715/791; 715/794

(58) Field of Classification Search ................ 701/211, 701/212; 340/995.1, 995.14, 995.19, 995.26; 715/767, 765, 778, 791, 794

See application file for complete search history.

(56) References Cited

U.S. PATENT DOCUMENTS

| | | | | |
|---|---|---|---|---|
| 6,006,161 A | * | 12/1999 | Katou | 701/212 |
| 6,031,530 A | * | 2/2000 | Trueblood | 715/791 |
| 6,202,026 B1 | * | 3/2001 | Nimura et al. | 701/211 |
| 6,243,645 B1 | * | 6/2001 | Moteki et al. | 701/211 |
| 2002/0165665 A1 | | 11/2002 | Kim | |
| 2003/0216861 A1 | * | 11/2003 | Sakata | 701/211 |

* cited by examiner

*Primary Examiner*—Thomas G. Black
*Assistant Examiner*—Brian J. Broadhead
(74) *Attorney, Agent, or Firm*—Muramatsu & Associates

(57) ABSTRACT

A display method and apparatus for a navigation system continuously provides the user the predetermined type of information, typically, the route to the destination even when the user changes the screen to any type of screen in the middle of the route guidance mode. The display method is comprised of the steps of starting a route guidance mode for guiding a user to a destination, detecting whether a user has changed to a new screen different from that in the route guidance mode, determining whether the user has reached the destination, displaying a route guidance screen within the new screen when the user has not reached the destination.

20 Claims, 9 Drawing Sheets

Fig. 1A
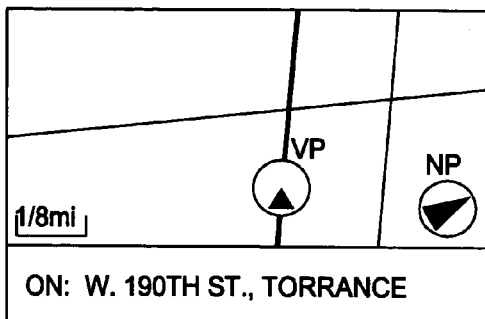
Fig. 1B
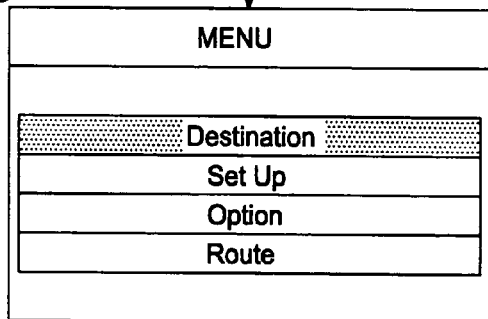
Fig. 1C
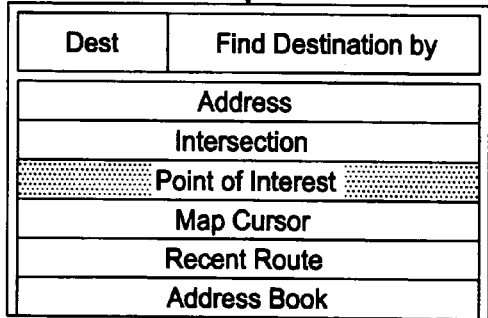
Fig. 1D
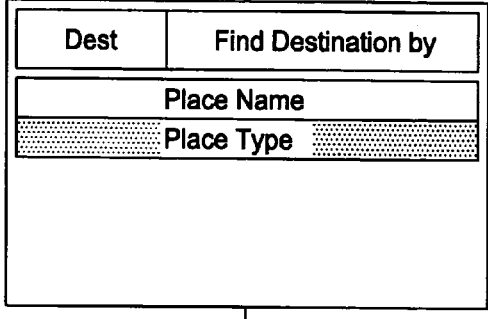
Fig. 1E
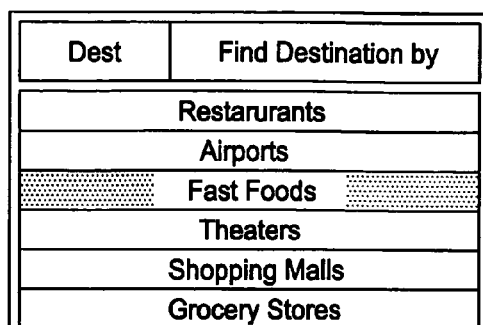
Fig. 1F
| Fast Foods | Hit 397 |
|---|---|
| Burger King | 1.23mi ↘ |
| Carl's Jr. | 1.45mi ↗ |
| Kentrucky Fried Chicken | 1.69mi ↑ |
| Pizza Hut | 2.21mi ↘ |
| Del Taco | 2.67mi ↗ |
Fig. 1G
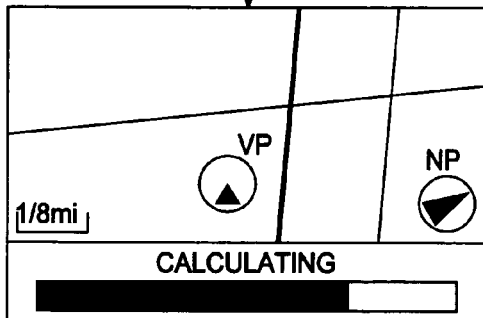
Fig. 1H
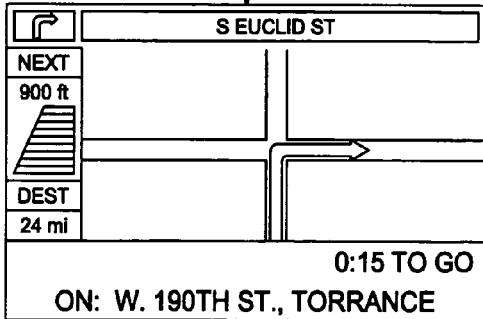

DISPLAY METHOD AND APPARATUS FOR NAVIGATION SYSTEM

FIELD OF THE INVENTION

This invention relates to a display method and apparatus for a navigation system, and more particularly, to a display method and apparatus for a navigation system which is capable of displaying a predetermined type of information, typically, a route guidance screen superposed on each of various other screens, thereby securely guiding the user to the destination.

BACKGROUND OF THE INVENTION

A navigation system performs travel guidance for enabling a user to easily and quickly reach the selected destination. A typical example is a vehicle navigation system where a user drives a car equipped with a navigation function. Such a navigation system detects the position of the vehicle, and reads out map data pertaining to an area at the current vehicle position from a data storage medium, for example, a CD-ROM (compact disc read-only memory), a DVD (digital versatile disc), or a hard disc. Alternatively, such map data can be provided from a remote navigation server through a communication network such as radio transmission or Internet.

When a destination is set, the navigation system starts a route guidance function for setting a guided route from the start point to the destination. To determine the guided route to the destination, the navigation system calculates and determines an optimum route to the destination based on various parameters. For example, the guided route is determined based on the shortest way to reach the destination, the route preferring freeways to surface roads, the least expensive way to the destination, the route without using toll road, or the like.

During the route guidance, the navigation system reads the nodes data from the data storage medium such as DVD and successively stores the nodes data of road segments (expressed in longitude and latitude) constituting the guided route in a map memory. In the actual traveling, the node series stored in the map memory is searched for a portion of the guided route to be displayed in a map display area of the monitor screen, and the portion of the guided route is highlighted to be clearly distinguished from other routes.

When the vehicle is within a predetermined distance of an intersection it is approaching, an intersection guidance diagram (an enlarged or highlighted intersection diagram with an arrow indicating the direction in which the vehicle is to turn at the intersection) is displayed to inform a user of the desired one of roads or directions selectable at the intersection. Such route guidance by the navigation system is also given by voice instruction.

FIGS. 1A–1H show an example of overall procedure and screen display involved in the navigation system. FIG. 1A shows an example of locator map screen of the navigation system when the destination is not specified. Typically, the navigation system displays a street on which the vehicle (current vehicle position VP) is running on a map image and a name of the street. Other information such as a north pointer NP, a map scale and a current time may also be illustrated on the screen.

An example of process for specifying a destination in the navigation system through a point of interest (POI) search method is shown in FIG. 1B–1F. A main menu screen such as shown in FIG. 1B displays menu items including a "Destination" menu for entering the destination. When selecting "Destination", the navigation system displays a "Find Destination by" screen as shown in FIG. 1C for specifying an input method for selecting the destination.

The "Find Destination By" screen lists various methods for selecting the destination including "Address" for specifying the city and address of the destination, "Intersection" for specifying the names of two streets which intersect with one another, and "Point of Interest (POI)" for selecting the programmed destination based on the name, category or telephone number. Other methods in the "Find Destination by" screen include "Recent Route" for specifying the destination based on the recent history of destinations saved in the navigation system, and "Address Book" for selecting the address of the destination out of the prescribed address list stored in the system.

When selecting, the "Point of Interest" method in FIG. 1C, the navigation system displays selection methods of point of interest (POI) either by "Place Name" or "Place Type" in FIG. 1D. The "Place Name" is to specify a name of POI, and the "Place Type" is to specify a category of POI. If the "Place Type" is selected in FIG. 1D, the navigation system lists categories of POIs as shown in FIG. 1E. The order of listing the categories may be arranged in, for example, an alphabetical order or an order of distance from the current position.

FIG. 1F shows a screen when the user has selected a "Fast Foods" category in the example of FIG. 1E. In this example, the screen includes a list of names of the fast food restaurants typically sorted by distance from the current destination. In this example, the user selects "Pizza Hut" as his destination. In FIG. 1G, the navigation system calculates and determines a guided route to the destination. After determining the guided route, the navigation system starts the route guidance as shown in FIG. 1H. Typically, the navigation system shows the intersection that is highlighted to show the next turn and a direction of the turn.

Suppose the navigation system is in the route guidance mode as shown in FIG. 2A to guide the user to the selected destination. During such a trip, the user may want to use the navigation system to other purposes, such as to search for a gas station or a restaurant on the way to the destination. For example, if the user wants to find a Japanese restaurant on the way to the destination, he has to change the screen of the navigation system to the POI search screen as shown in FIG. 2B. During such a search mode, the route guidance information such as FIG. 2A is unavailable and the user may not be able to turn at the appropriate intersection.

Similarly, as shown in FIGS. 3A and 3B, when the user changes the screen after the route guidance screen, the guidance information is not provided to the user. For example, when the user maneuvers the navigation system to view a menu screen (FIG. 3A) with menu bars 9 or a map image of a remote area (FIG. 3B), the user cannot see the route guidance information. Because the navigation system in the conventional technology cannot provide the route guidance information on the display in such a case, it has a disadvantage in that the user is confused in following the direction to reach the destination.

SUMMARY OF THE INVENTION

It is, therefore, an object of the present invention to provide a display method and apparatus that can continuously provide the predetermined display mode, typically, the route guidance information, when the display screen of the navigation system is changed to that other than the predetermined display mode.

It is another object of the present invention to provide a display method and apparatus which is able to show the predetermined type of information, for example, the route guidance information when a user changes to any type of screen of the navigation system.

It is a further object of the present invention to provide a display method and apparatus which is able to show the predetermined type of information, for example, the route guidance information on any type of new screen of the navigation system by inserting the route guidance screen in a vacant space of the new screen or superposed on the image in the new screen.

It is a further object of the present invention to provide a display method and apparatus which is able to show the predetermined type of information, for example, the route guidance information on any type of new screen of the navigation system in which a size and position of the route guidance screen can be changed freely.

One aspect of the preset invention is a display method for a navigation system for continuously displaying predetermined type of information, which is typically but not limited to route guidance information. The display method is comprised of the steps of: starting a screen display showing a predetermined type of information on the navigation system, detecting if a user has changed to a new screen other than that showing the predetermined type of information, and displaying a screen showing the predetermined type of information within the new screen.

In the case of the route guidance information, the display method is comprised of the steps of starting a route guidance mode for guiding a user to a destination, detecting if a user has changed to a new screen different from that in the route guidance mode, determining whether the user has reached the destination, displaying a route guidance screen within the new screen when the user has not reached the destination.

The display method of the present invention includes a process of determining whether a sufficient vacant space exists in the new screen to display the route guidance screen therein, and if there is a sufficient vacant space, inserting the route guidance screen in the vacant space. Alternatively, if there is not a sufficient vacant space in the new screen, the method includes a process of superposing the route guidance screen on the images in the new screen. The route guidance screen illustrates at least a direction of turn at an intersection and an identification of a street at the intersection.

The display method includes a step of presetting a size and a location of the route guidance screen in the navigation system. Further, the display method includes a step of adjusting a size and a location of the route guidance screen in the new screen by the user. For such an adjustment, the method includes a step of using an input device separate from a monitor screen of the navigation system or directly touching a surface of the monitor screen. Further, for adjusting the size and location of the route guidance screen, the display method includes a step of using a minimize button or a maximize button on the route guidance screen.

Another aspect of the present invention is a display apparatus for a navigation system for implementing the various steps defined in the display method of the present invention noted above. The display apparatus provides the route guidance information on whatever the type of the screen the user is looking.

According to the present invention, the navigation system is capable of constantly providing the user the predetermined type of information, typically, the information on the route to the destination even when the user changes the screen to another screen in the middle of the route guidance mode. The route guidance screen may be inserted in a vacant space of the new screen or superposed on the image in the new screen. The size and position of the route guidance screen can be changed freely so that the user can enjoy optimum use of the information on the current screen and the route guidance information.

BRIEF DESCRIPTION OF THE DRAWINGS

FIGS. 1A–1H are schematic diagrams showing an example of operational process and screen display involved in the navigation system for selecting a destination.

FIG. 10A shows an example of display when the route guidance screen is maximized, and FIG. 10B shows an example of display when the route guidance screen is minimized.

FIG. 11A shows the route guidance screen at about the center of the screen, and FIG. 11B shows the route guidance screen at the left.

DETAILED DESCRIPTION OF THE INVENTION

The present invention will be described in detail with reference to the accompanying drawings. The navigation system of the present invention is designed to constantly display a predetermined type of information even when the display mode is changed. Typically, such a type of information is route guidance information in which the route guidance screen is displayed even when the user traverses the display screen to other screens such as a menu screen, a name list screen, etc.

It should be noted that the application of the present invention is not limited to the case of displaying the route guidance mode but can be applied to any predetermined display mode. For example, the predetermined display mode can be traffic incident information from a remote server, POI information along the route to the destination, etc. However, the present invention will be explained for the case of displaying the route guidance screen on another type of screen for an illustration purpose. The navigation system displays the route guidance information by placing the route guidance screen on an empty area if such an area is available. Alternatively, the navigation system displays the route guidance information by superimposing the route guidance screen on other screen.

Figure 3A:
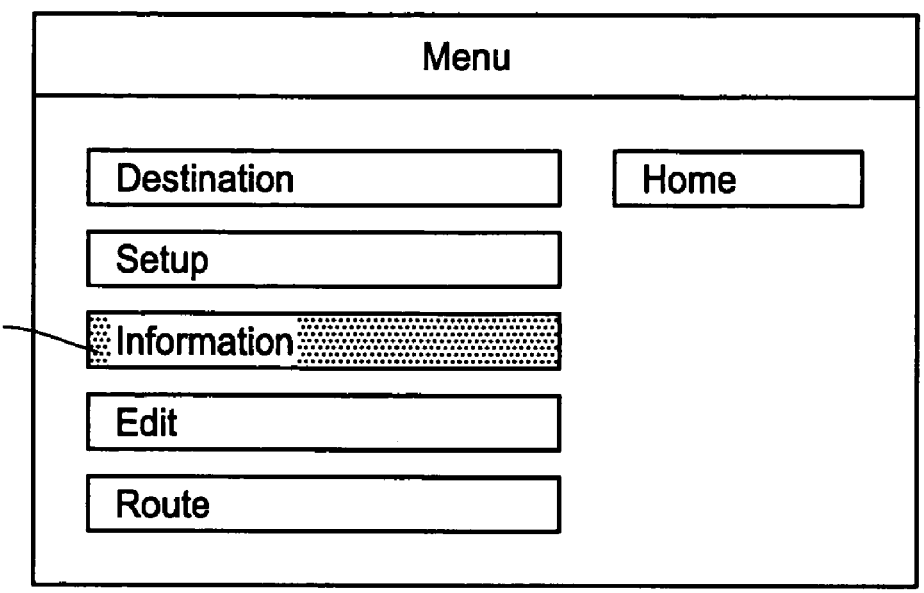
FIGS. 3A–3B are schematic diagrams showing examples of screen display in the conventional navigation system when the navigation system is changed to display modes other than route guidance mode.
Figure 3B:
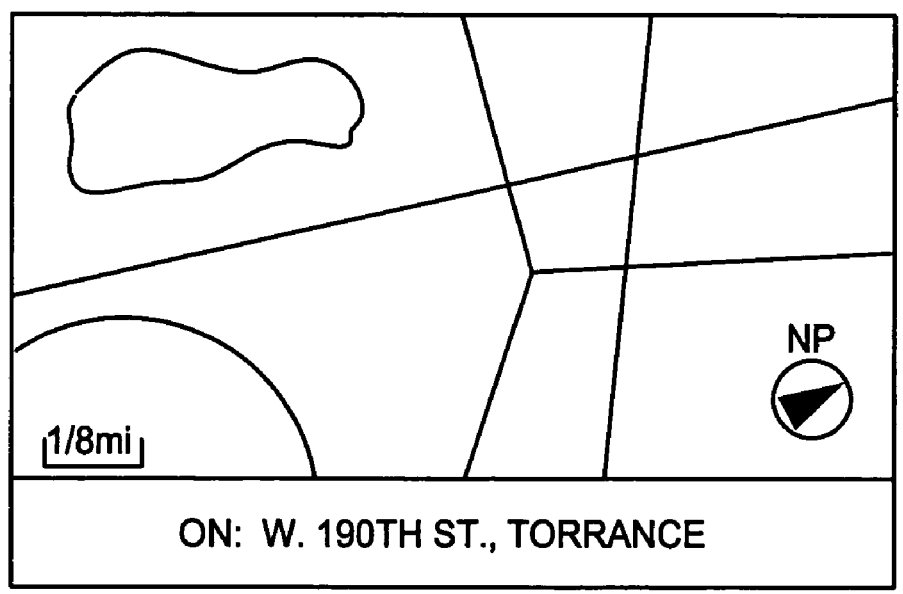

The user can specify a size of the route guidance screen or a location of the route guidance screen in the navigation system in advance, for example, through a system "Setup" menu (FIG. 3A or 6A). Further, the user can change the size and location of the route guidance screen through an input device such as a remote controller or directly touching the screen surface, etc. In the present invention, the user is able to see the route guidance information at any display modes once the route guidance mode is started.

Figure 4:
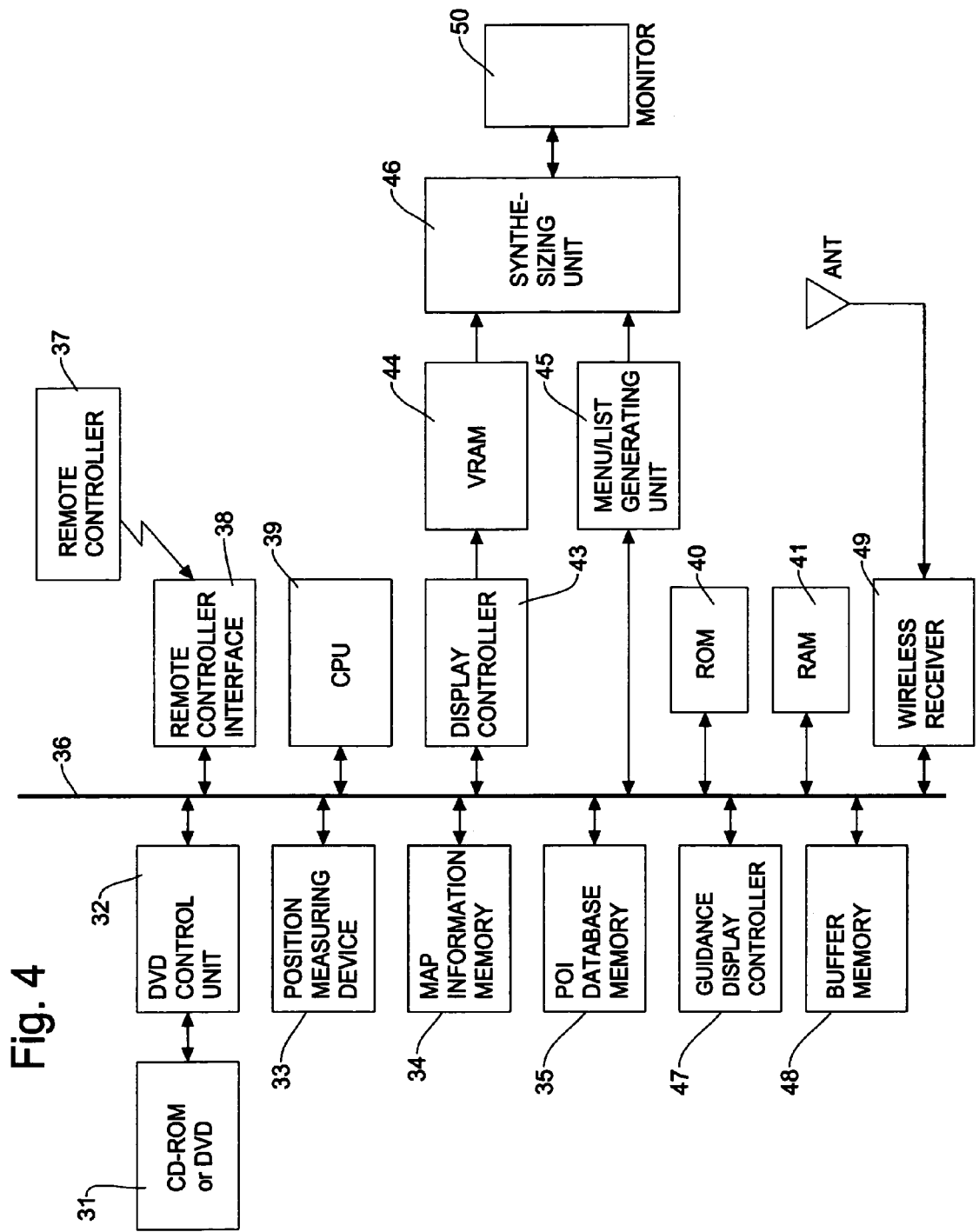
FIG. 4 is a block diagram showing an example of structure in the vehicle navigation system for implementing the present invention for additionally showing route guidance information on the screen when the navigation system is in any display mode.

The display method and apparatus of the present invention is advantageously applicable to a vehicle navigation system. FIG. 4 shows an example of structure of a vehicle navigation system implementing the present invention. It should be noted that the present invention can also be applied to a portable navigation device such as a one implemented by a PDA (personal digital assistant) device, a lap-top computer, or other hand-held devices.

In the block diagram of FIG. 4, the navigation system includes a map storage medium 31 such as a CD-ROM, DVD, hard disc or other storage means (hereafter "DVD") for storing map information, a DVD control unit 32 for a controlling an operation for reading the map information from the DVD, a position measuring device 33 for measuring the present vehicle position. The position measuring device 33 has a vehicle speed sensor for detecting a moving distance, a gyroscope for detecting a moving direction, a microprocessor for calculating a position, a GPS receiver, and etc.

The block diagram of FIG. 4 further includes a map information (data) memory 34 for storing the map information which is read out from the DVD 31, a database memory 35 for storing database information such as point of interest (POI) information which is read out from the DVD 31, a remote controller 37 for executing a menu selection operation, an enlarge/reduce operation, a destination input operation, etc. and a remote controller interface 38.

The navigation system further includes a bus 36 for interfacing the above units in the system, a processor (CPU) 39 for controlling an overall operation of the navigation system, a ROM 40 for storing various control programs such as a route search program and a map matching program necessary for navigation control, a RAM 41 for storing a processing result such as a guide route, a display controller 43 for generating a map image (a map guide image and an arrow guide image) on the basis of the map information, a VRAM (Video RAM) 44 for storing images generated by the display controller, a menu/list generating unit 45 for generating menu image/various list images, a synthesizing unit 46, a route guidance display controller 47, a buffer memory 48, a wireless receiver 49, and a monitor (display) 50.

The route guidance display controller 47 performs the essential function of the present invention for detecting a change in the type of display and superposing the route guidance screen on the new screen. The route guidance display controller 47 receives the map data and the current position data to produce the route guidance data. The route guidance display controller 47 also receives control signals from an input device such as a remote controller to change the size and position of the route guidance screen attached to the other screen.

Information needed for superposing the route guidance screen may be temporarily stored in the buffer memory 48 for data processing. When detecting the change of the screen from the normal route guidance mode, the route guidance display controller 47 evaluates the type of new screen on the monitor 50 to check if there is any sufficient space for displaying the route guidance screen. If there is such a space, the route guidance display controller 47 causes the monitor 50 to display the route guidance screen in the space. If there is not a sufficient space, the route guidance display controller 47 causes the monitor 50 to display the route guidance screen over the image of the other screen.

Figure 5:
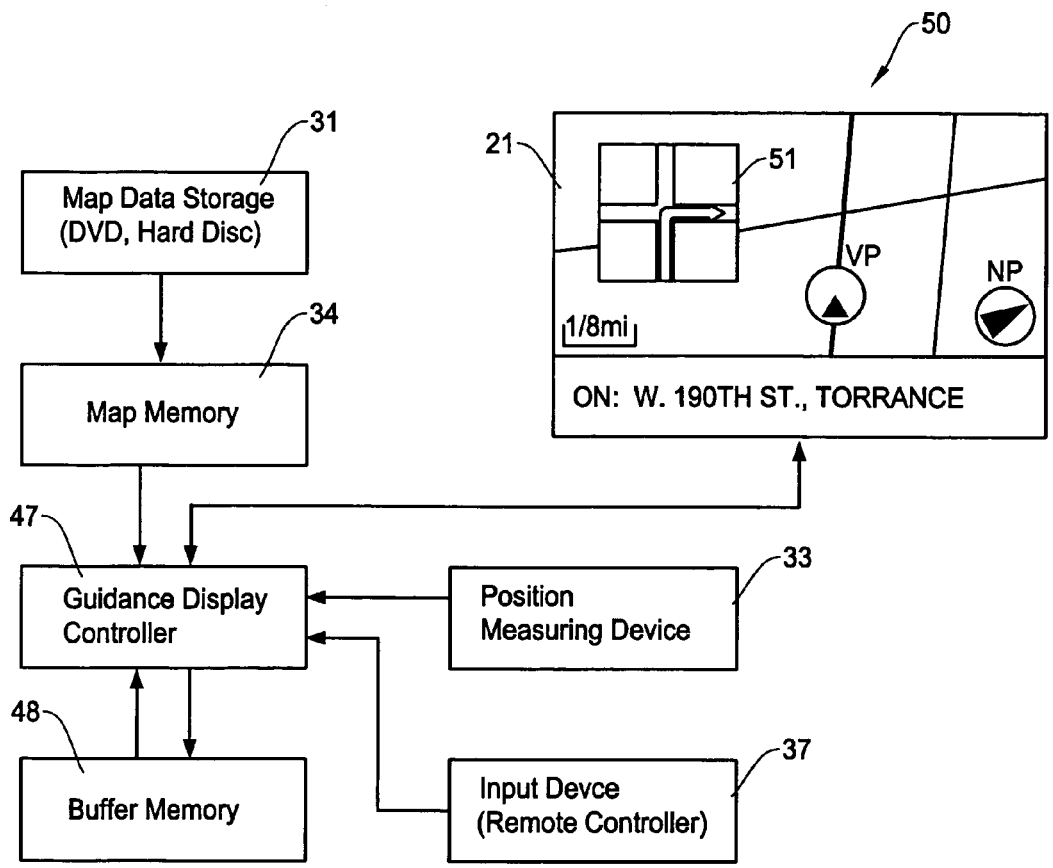
FIG. 5 is a functional block diagram showing a basic structure of the apparatus of the present invention for additionally showing route guidance information on the screen when the navigation system is in any display mode.

FIG. 5 is a functional block diagram showing an example of basic structure of the apparatus of the present invention for detecting a change of the screen from the route guidance mode, checking a manner of illustrating the route guidance screen in the new screen, and inserting or superposing the route guidance screen on the new screen. The structure of FIG. 5 is illustrated by the components in the block diagram of FIG. 4 that are directly related to the operation of the present invention. The components of the apparatus of the present invention includes a monitor 50 for interfacing with the user, and a route guidance display controller 47 for controlling an overall operation of the apparatus of the present invention.

The block diagram of FIG. 5 further includes a map data storage 31 such as a DVD or a hard disc for storing map data, a map memory 34 for storing map data from the map data storage 31, a position measuring device 33 for detecting a current position of the user, an input device such as a remote controller 37 for entering command signals including scroll signals, and a buffer memory 48 for temporarily storing various types of data for processing and operation of the apparatus. In an actual application, the route guidance display controller 47 can be implemented by the CPU 39 in FIG. 4 or by a separate controller such as a microprocessor. Further, the buffer memory 48 can be implemented by the RAM 41 in FIG. 4 or other memory.

As shown in FIG. 5, the navigation system is able to retrieve the map data from the map memory 34 and map data storage 31. The route guidance display controller 47 receives the map data from the map memory 34 and map data storage 31 and the current position data from the position measuring device 33 to produce the route guidance data. During the route guidance mode, the route guidance display controller 47 performs the conventional route guidance operation by displaying the route guidance screen on the monitor 50.

Figure 2A:
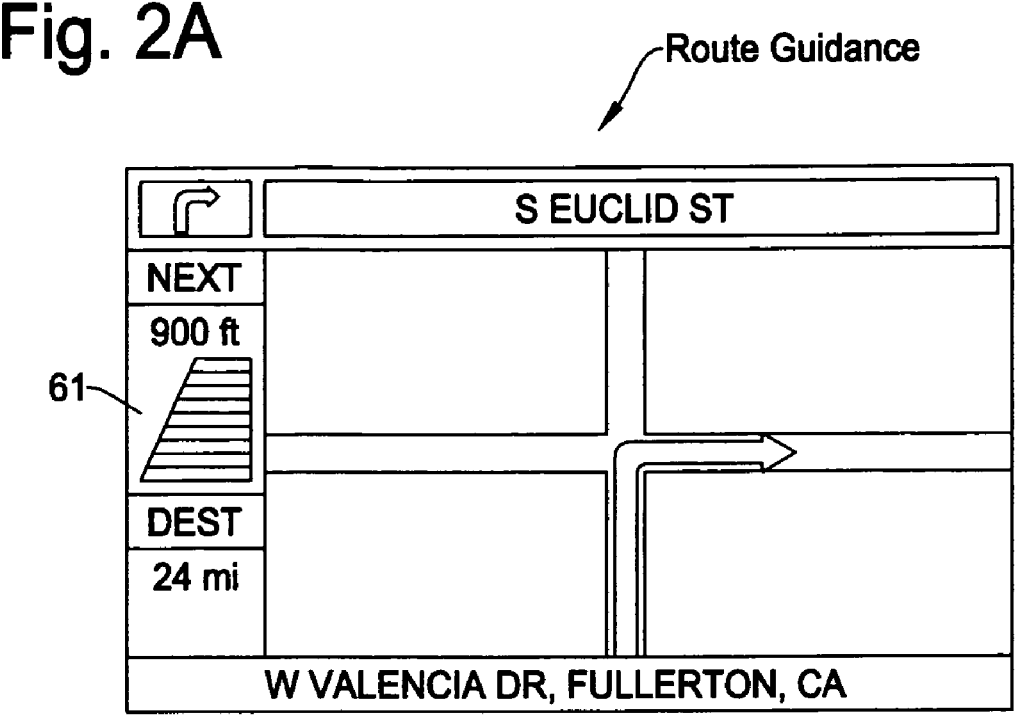
FIG. 2A is a schematic diagram showing an example of screen display indicating route guidance information.
Figure 2B:
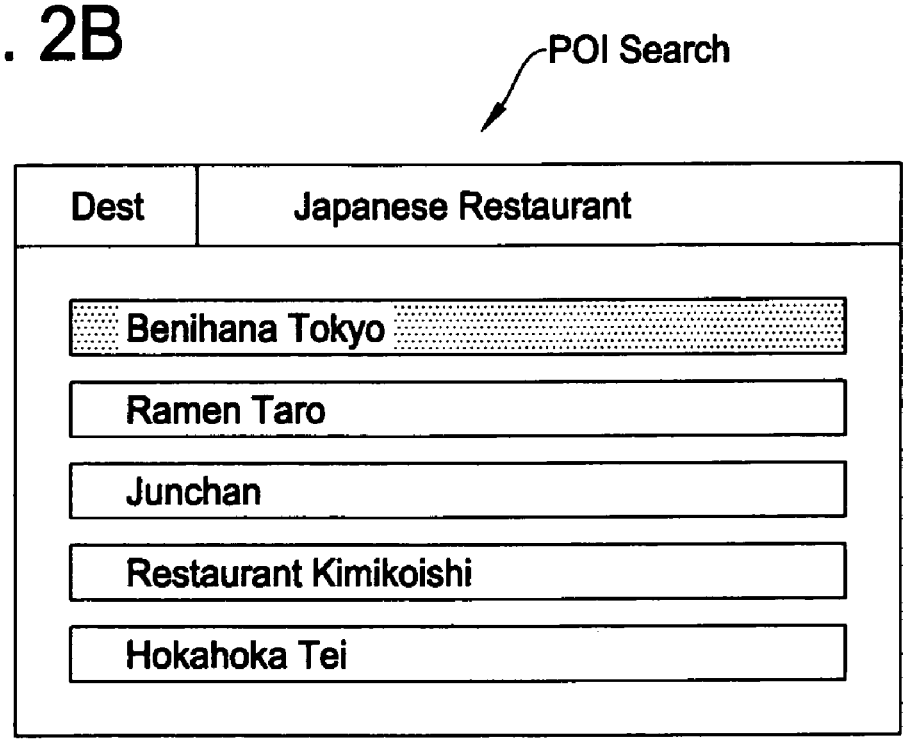
FIG. 2B is an example of screen display when the navigation system is changed to a POI search mode in the middle of the route guidance mode.

After specifying the destination and the user is now on the way to the destination under the route guidance mode of the navigation system, the user wants to change the screen to other mode. As described with reference to FIGS. 2A and 2B, such a situation arises, for example, when the user wants to find out a restaurant or a gas station, etc., during the trip to the destination. When the user changes the screen of the navigation system to a new screen, the route guidance display controller 47 detects the change of the screen.

Upon detecting the change of the screen from that of the route guidance mode, the route guidance display controller 47 checks whether the user has reached the destination so that the route guidance is no longer necessary. Typically, since the navigation system generates an arrival detection signal upon arriving the destination, the route guidance display controller 47 can tell whether or not the user has arrived at the destination. If the user has not reached the destination, the route guidance information is still necessary.

Thus, the route guidance display controller 47 checks the type of new screen to see whether there is any space for inserting the route guidance screen in the space. If there is such a space, the route guidance display controller 47 causes the monitor 50 to display the route guidance screen 51 within the space. If there is not a sufficient space, the route guidance display controller 47 causes the monitor 50 to display the route guidance screen 51 over the image of the new screen.

The user can preset the size of the route guidance screen 51 or the location of the route guidance screen 51 in the navigation system as noted above, for example, through a system setup menu (FIG. 3A or 6A). Further, the user can change the size and location of the route guidance screen through an input device such as a remote controller or other means such as directly touching the screen surface of the monitor 50. In FIG. 5, the route guidance display controller 47 receives control signals from the remote controller 37 to change the size and position of the route guidance screen attached to the other screen.

Figure 6:
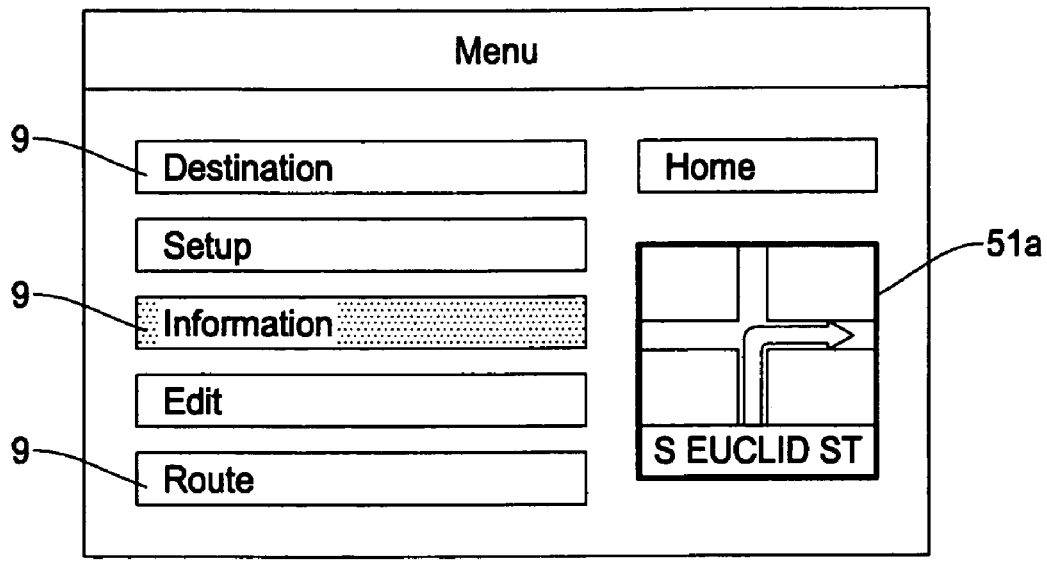
FIG. 6 is a schematic diagram showing an example of display in which a route guidance information screen is superposed when the user has changed the screen to a menu screen in the middle of the route guidance mode in accordance with the present invention.

FIGS. 6–9, 10A–10B and 11A–11B show display examples of route guidance screen in accordance with the present invention. FIG. 6 shows an example of a display illustrating a main menu screen of the navigation system in which a route guidance screen 51a is inserted in a vacant space at the right side of the screen. The main menu screen of FIG. 6 is similar to that shown in FIG. 3A except that the route guidance screen 51a is included in the vacant space. The example of FIG. 6 takes advantage of the empty area of the new screen by placing the route guidance screen 51a therein to inform the user about the next maneuver.

In the example of FIG. 6, the route guidance screen 51a shows an image of the next intersection at which the user should turn, an arrow showing a direction of the turn, and an identification of the intersecting street, typically a name of the street. Thus, the route guidance screen 51a includes sufficient information for constantly reminding the user about the next move. In this manner, when the user is in the route guidance mode, the present invention can constantly provide the route guidance information even when the user changes the screen.

Figure 7:
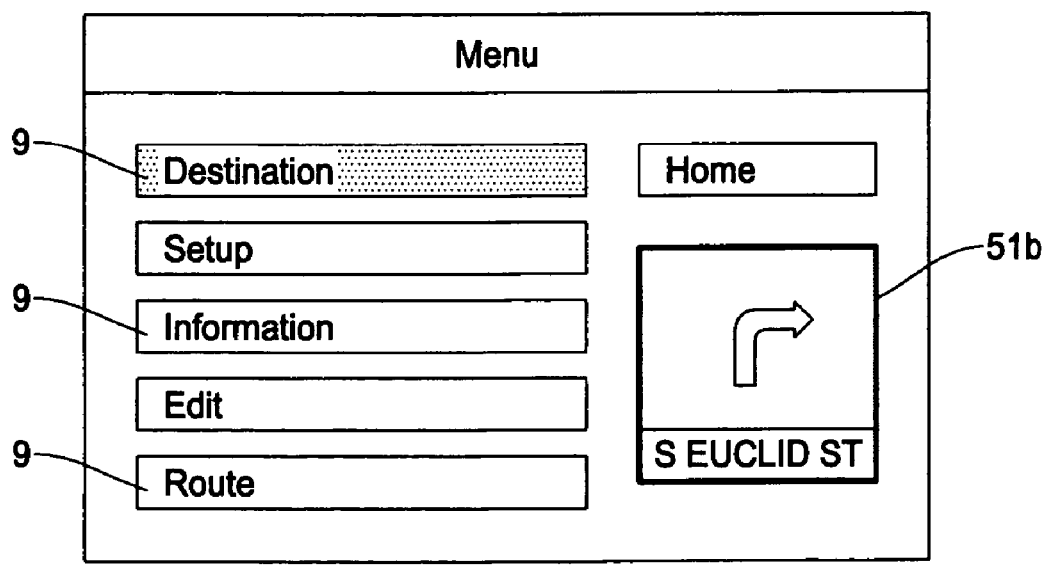
FIG. 7 is a schematic diagram showing another example of display in which a route guidance information screen is superposed when the user has changed the screen to a menu screen in the middle of the route guidance mode in accordance with the present invention.

FIG. 7 shows another example of the present invention in which the screen illustrates a route guidance screen 51b at the right side thereof. This screen is similar to that shown in FIG. 6 except that the route guidance screen 51b is a more simplified one compared to the route guidance screen 51a shown in FIG. 6. As shown in FIG. 7, the route guidance screen 51b has only an arrow indicating the direction of the next turn and the street name where the maneuver is to be taken. Since a vacant space available to show guidance information can be small, a simplified representation is sometimes preferred to effectively convey the information to the user.

Figure 8:
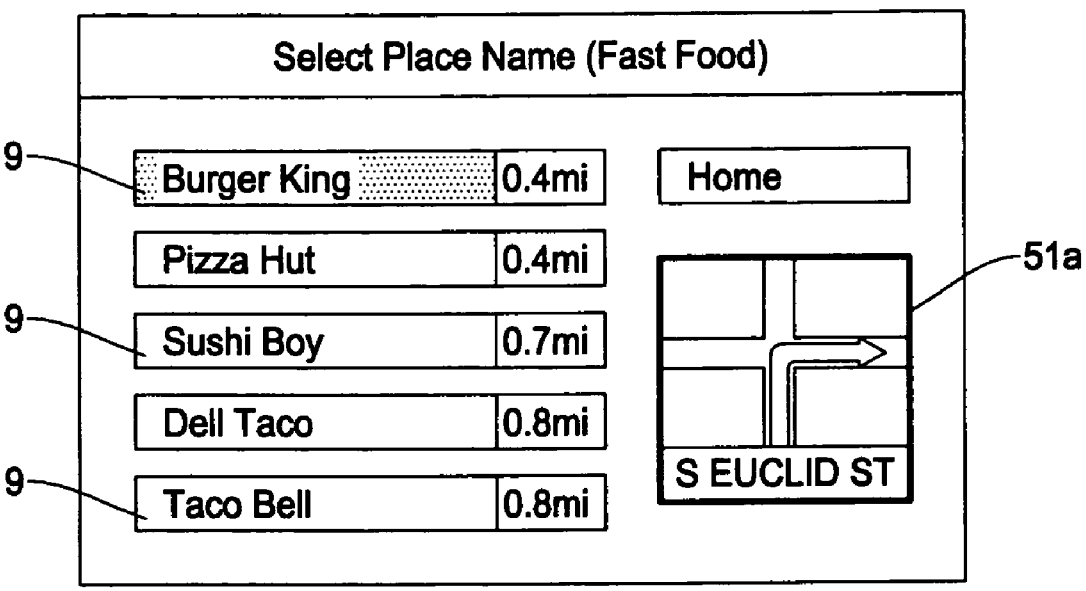
FIG. 8 is a schematic diagram showing an example of display in which a route guidance information screen is superposed when the user has changed the screen to a screen listing POI place names in the middle of the route guidance mode in accordance with the present invention.

FIG. 8 shows an example of display in which a route guidance information screen is inserted when the user has changed the screen to a screen listing POI place names in the middle of the route guidance mode. In this example, since the name list screen has a vacant space, the route guidance screen 51a is inserted in the space at the right of the screen. Since there is an unused space in the POI name list, the display in FIG. 8 takes advantage of the unused space by placing the route guidance screen 51a to inform the user about next maneuver.

Figure 9:
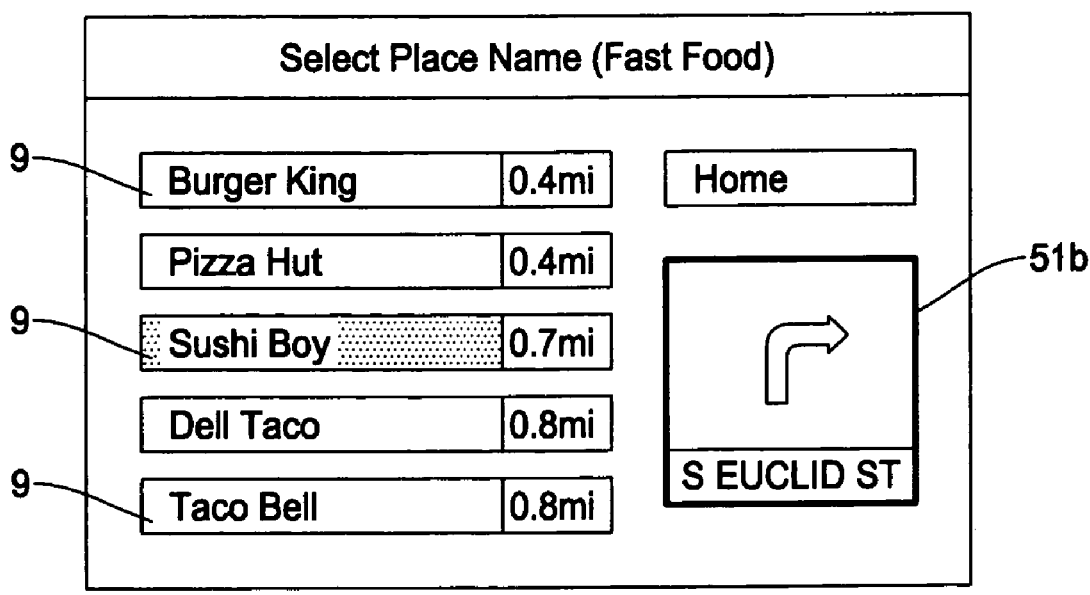
FIG. 9 is a schematic diagram showing another example of display in the present invention in which a route guidance information screen is superposed when the user has changed the screen to a screen listing POI place names in the middle of the route guidance mode.

FIG. 9 shows another example of a screen showing the route guidance screen 51b at the right of the screen in the present invention. This screen is similar to that shown in FIG. 8 except that the route guidance screen 51b is a more simplified representation compared to the route guidance screen 51a shown in FIG. 8. Since a vacant space available to show guidance information can be small, a simplified representation is sometimes preferable for effectively conveying the information to the user.

Figure 10A:
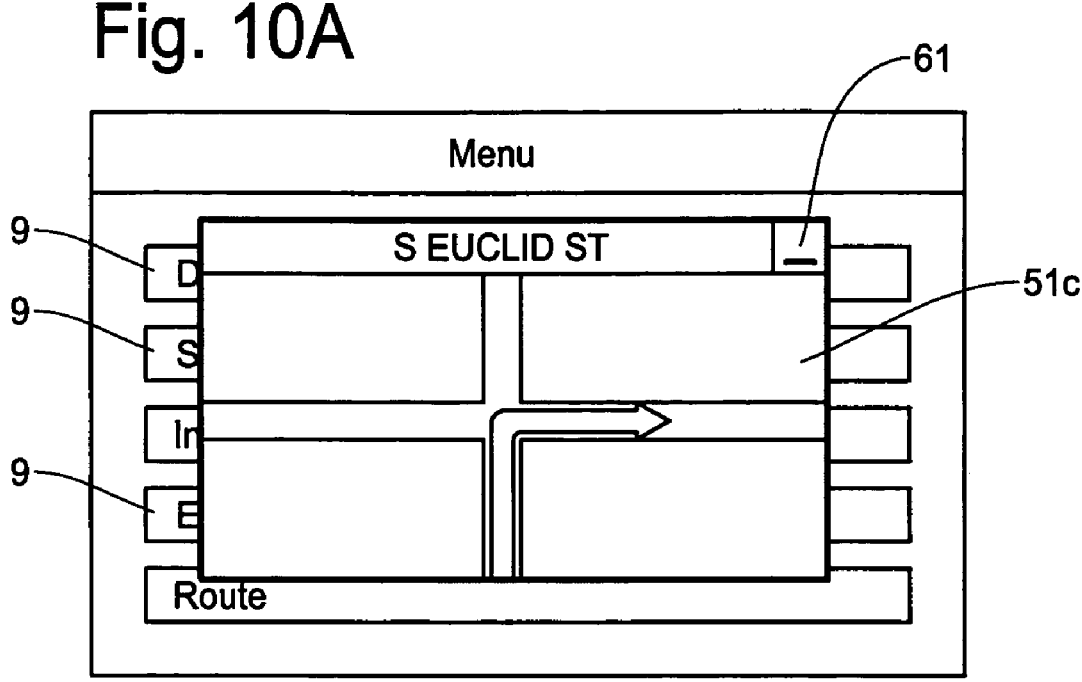
FIGS. 10A and 10B are schematic diagrams showing examples of display in the present invention in which a route guidance information screen is superposed with another screen when the user has changed the screen to a menu screen in the middle of the route guidance mode.

FIG. 10A shows another example of display in which a route guidance information screen is superposed thereon when the user has changed the screen to a menu screen in the middle of the route guidance mode. In this example, menu bars 9 occupy the most of the screen space, thus there is no sufficient vacant space. Accordingly, in the example of FIG. 10A, a route guidance screen 51c is superposed on the menu bars 9 on the menu screen.

As noted above, the size and location of the route guidance screen 51a, 51b or 51c can be changed by, for example, a zoom key or cursor buttons or the like of an input device such as a remote controller or by touching the monitor screen. In this example of FIG. 10A, it is so designed that the size of the route guidance screen 51c can be changed in a manner similar to Window operating system. Namely, the route guidance screen 51c in FIG. 10A is at its maximum size in which a minimize button 61 is provided for minimizing or hiding the route guidance screen 51c so that the user can view all of the menu bars 9 underneath.

Figure 10B:
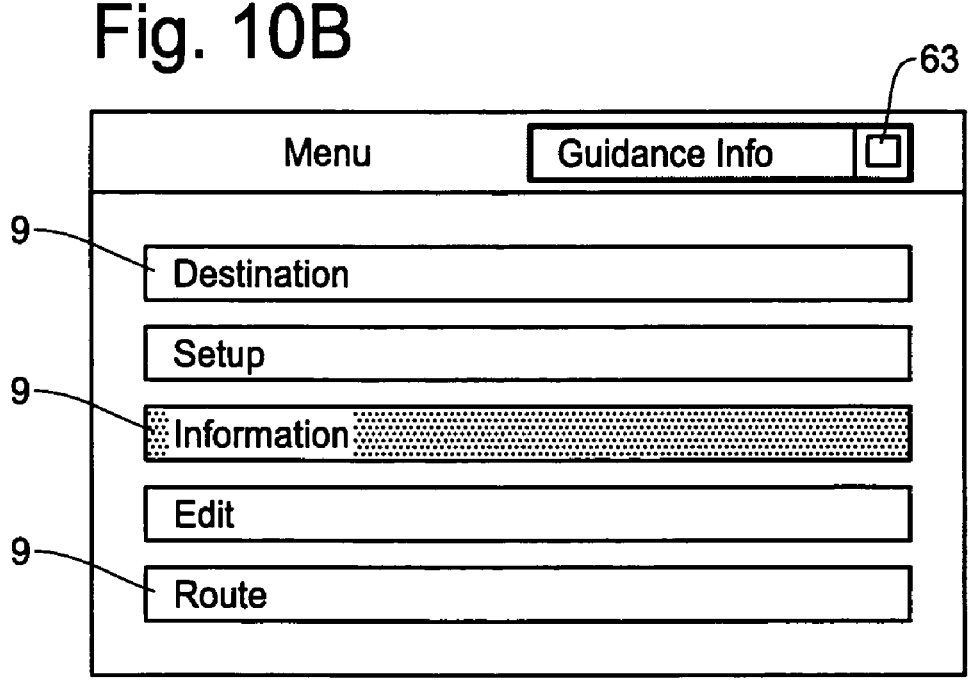

FIG. 10B shows an example of a screen when the user presses the minimize button 61 in the screen of FIG. 10A to hide the navigation guidance information screen 51c. The screen of FIG. 10B includes a maximize button (guidance information button) 63 at the top right corner so that the user can see the enlarged view of the route guidance screen 51c over the menu screen. Thus, if the user presses the maximize button 63, the screen returns to the one in FIG. 10A which includes the route guidance screen 51c superposed on the menu screen. By using the buttons 61 and 63, the user can easily toggle between the screens shown in FIG. 10A and FIG. 10B.

Figure 11A:
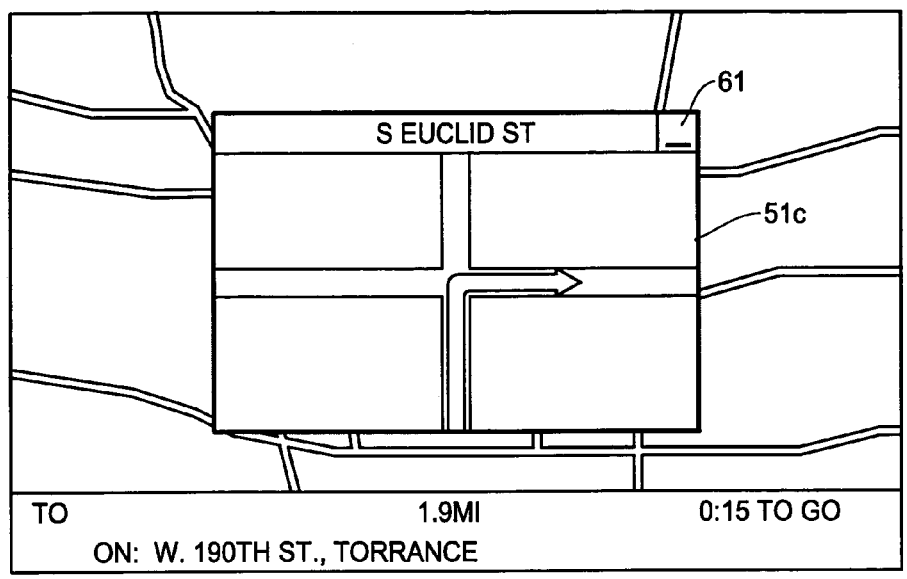
FIGS. 11A and 11B are schematic diagrams showing examples of display in the present invention in which a route guidance information screen is superposed when the user has changed the screen to a map screen in the middle of the route guidance mode.
Figure 11B:
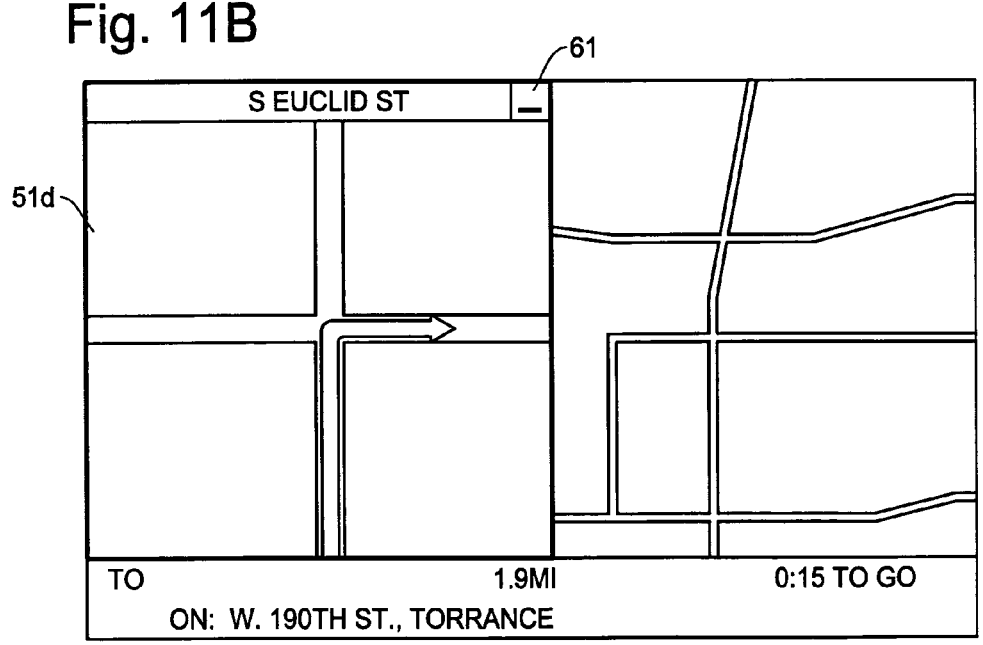

FIGS. 11A and 11B are schematic diagrams showing examples of display in the present invention in which a route guidance information screen is superposed when the user has changed the screen to a map screen in the middle of the route guidance mode. In FIG. 11A, the route guidance screen 51c is superposed on the map image at about the center of the screen. In this example, the route guidance screen 51c hides the major portion of the map image underneath. Since the route guidance screen 51c has the minimize button 61, the user can easily minimize the route guidance screen 51c as in FIG. 10B.

FIG. 11B is a screen example of the present invention in which a route guidance screen 51d is displayed at the left side of the map screen. As noted above, the size and position of the route guidance screen can be freely adjusted in advance or while in use. The navigation system can effectively use the display screen by constantly reminding the user about the next move while displaying the map image on the screen. Thus, the user can see both the route guidance information and the map image at the same time.

As described above, the navigation system of the present invention is capable of constantly informing the user about the route to the destination even when the user changes the screen to another screen in the middle of the route guidance mode. The route guidance screen may be inserted in a vacant space of the new screen or superposed on the image on the new screen. The size and position of the route guidance screen can be changed freely so that the user can enjoy optimum use of the information on the current screen and the route guidance information.

In the foregoing description, although the present invention has been explained for the case of displaying the route guidance screen on another type of screen, it should be noted that the application of the present invention is not limited to the case of displaying the route guidance mode but can be applied to any predetermined display mode. For example, the predetermined display mode can be traffic incident information from a remote server, POI information along the route to the destination, etc.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A display method for a navigation system, comprising the following steps of:
   starting a route guidance mode for guiding a user to a selected destination;
   detecting if a user has changed to a new screen other than that of the route guidance mode;
   determining whether the user has reached the destination; and
   displaying a route guidance screen within the new screen when the user has not reached the destination.

2. A display method for a navigation system as defined in claim 1, wherein said step of determining whether the user has reached the destination includes a step of checking whether an arrival detection signal is generated by the navigation system.

3. A display method for a navigation system as defined in claim 1, further comprising a step of determining whether a sufficient vacant space exists in the new screen to display the route guidance screen therein, and if there is a sufficient vacant space, inserting the route guidance screen in the vacant space of the new screen.

4. A display method for a navigation system as defined in claim 1, further comprising a step of determining whether a sufficient vacant space exists in the new screen to display the route guidance screen therein, and if there is not a sufficient vacant space, superposing the route guidance screen on images in the new screen.

5. A display method for a navigation system as defined in claim 1, further comprising a step of presetting a size and a location of the route guidance screen in the navigation system.

6. A display method for a navigation system as defined in claim 1, wherein said step of displaying the route guidance screen within the new screen includes a step of adjusting a size and a location of the route guidance screen in the new screen by the user.

7. A display method for a navigation system as defined in claim 6, wherein said step of adjusting the size and location of the route guidance screen includes a step of using an input device separate from a monitor screen of the navigation system or directly touching a surface of the monitor screen.

8. A display method for a navigation system as defined in claim 6, wherein said step of adjusting the size and location of the route guidance screen includes a step of using a minimize button or a maximize button on the route guidance screen.

9. A display method for a navigation system as defined in claim 1, wherein said route guidance screen illustrates at least a direction of turn at an intersection and an identification of a street at the intersection.

10. A display method for a navigation system as defined in claim 1, wherein said route guidance screen illustrates at least an image of an intersection, a direction of turn at an intersection, and a name of a street at the intersection.

11. A display apparatus for a navigation system, comprising:
   means for starting a route guidance mode for guiding a user to a selected destination;
   means for detecting whether a user has changed to a new screen other than that of the route guidance mode;
   means for determining whether the user has reached the destination; and
   means for displaying a route guidance screen within the new screen when the user has not reached the destination.

12. A display apparatus for a navigation system as defined in claim 11, wherein said route guidance screen illustrates at least an image of an intersection, a direction of turn at an intersection, and a name of a street at the intersection.

13. A display apparatus for a navigation system as defined in claim 11, wherein said means for determining whether the user has reached the destination includes means for checking whether an arrival detection signal is generated by the navigation system.

14. A display apparatus for a navigation system as defined in claim 11, further comprising means for determining whether a sufficient vacant space exists in the new screen to display the route guidance screen therein, and if there is a sufficient vacant space, inserting the route guidance screen in the vacant space of the new screen.

15. A display apparatus for a navigation system as defined in claim 11, further comprising means for determining whether a sufficient vacant space exists in the new screen to display the route guidance screen therein, and if there is not a sufficient vacant space, superposing the route guidance screen on images in the new screen.

16. A display apparatus for a navigation system as defined in claim 11, further comprising means for presetting a size and a location of the route guidance screen in the navigation system.

17. A display apparatus for a navigation system as defined in claim 11, wherein said means for displaying the route guidance screen within the new screen includes means for adjusting a size and a location of the route guidance screen in the new screen by the user.

18. A display apparatus for a navigation system as defined in claim 17, wherein said means for adjusting the size and location of the route guidance screen includes means for using an input device separate from a monitor screen of the navigation system or directly touching a surface of the monitor screen.

19. A display apparatus for a navigation system as defined in claim 17, wherein said means for adjusting the size and location of the route guidance screen includes means for using a minimize button or a maximize button on the route guidance screen.

20. A display apparatus for a navigation system as defined in claim 11, wherein said route guidance screen illustrates at least a direction of turn at an intersection and an identification of a street at the intersection.

* * * * *